US009157242B2

(12) United States Patent
Thomas et al.

(10) Patent No.: US 9,157,242 B2
(45) Date of Patent: Oct. 13, 2015

(54) BUILDING MATERIALS, COMPOSITIONS, AND METHODS

(71) Applicant: Georgia-Pacific Gypsum LLC, Atlanta, GA (US)

(72) Inventors: Vincent B. Thomas, Bogart, GA (US); Jeffrey Thomas Fields, Suwanee, GA (US)

(73) Assignee: Georgia-Pacific Gypsum LLC, Atlanta, GA (US)

(*) Notice: Subject to any disclaimer, the term of this patent is extended or adjusted under 35 U.S.C. 154(b) by 159 days.

(21) Appl. No.: 14/046,314

(22) Filed: Oct. 4, 2013

(65) Prior Publication Data
US 2014/0175322 A1 Jun. 26, 2014

Related U.S. Application Data

(63) Continuation-in-part of application No. 13/722,626, filed on Dec. 20, 2012, now Pat. No. 8,926,855.

(51) Int. Cl.
| | |
|---|---|
| *E04B 1/04* | (2006.01) |
| *C04B 24/00* | (2006.01) |
| *C04B 111/52* | (2006.01) |
| *E04F 15/20* | (2006.01) |
| *E04B 1/84* | (2006.01) |
| *E04B 1/82* | (2006.01) |

(Continued)

(52) U.S. Cl.
CPC .............. *E04F 15/20* (2013.01); *C04B 28/145* (2013.01); *E04B 1/82* (2013.01); *E04B 1/84* (2013.01); *C04B 2111/52* (2013.01); *C04B 2111/60* (2013.01); *Y02W 30/92* (2013.01)

(58) Field of Classification Search
CPC ......... E04F 15/20; E04B 1/84; C04B 28/145; C04B 28/146; C04B 28/147; C04B 14/368; C04B 20/0032; C04B 7/02; C04B 18/08; C04B 22/0013; C04B 22/143; C04B 2103/20; C04B 2103/40
See application file for complete search history.

(56) References Cited

U.S. PATENT DOCUMENTS

| | | | |
|---|---|---|---|
| 3,183,107 A * | 5/1965 | Alford et al. | 106/676 |
| 3,424,270 A | 1/1969 | Hartman et al. | |
| 3,878,278 A | 4/1975 | Miller | |

(Continued)

FOREIGN PATENT DOCUMENTS

| | | | |
|---|---|---|---|
| CN | 86100457 A | | 9/1986 |
| GB | 743866 | * | 1/1956 |

(Continued)

OTHER PUBLICATIONS

Translation of WO 95/26323, Oct. 1995.*

(Continued)

*Primary Examiner* — Carol M Koslow
(74) *Attorney, Agent, or Firm* — Ram W. Sabnis (57) ABSTRACT

Building materials include a dampening layer which contains a plaster, and hollow microspheres, such as polymeric microspheres. Methods of making a sound dampening material include providing a plaster mixture. The mixture may include hollow microspheres. The plaster mixture is combined with water to form a slurry. The slurry is applied to a surface so that it sets to form a sound dampening layer. Methods of dampening sound through a structure include disposing a dampening layer on a surface of or within a wall, door, floor, ceiling, roof, or floor/ceiling assembly.

40 Claims, 6 Drawing Sheets

(51) Int. Cl.
*C04B 28/14* (2006.01)
*C04B 111/60* (2006.01)

(56) References Cited

U.S. PATENT DOCUMENTS

| | | |
|---|---|---|
| 2002/0071947 A1 | 6/2002 | Soane et al. |
| 2009/0078162 A1* | 3/2009 | Clausi et al. ............... 106/783 |
| 2010/0018133 A1 | 1/2010 | Boyadjian et al. |
| 2010/0043344 A1 | 2/2010 | Tada et al. |
| 2011/0051324 A1 | 3/2011 | Ihara |

FOREIGN PATENT DOCUMENTS

| | | |
|---|---|---|
| JP | 01313351 A | 12/1989 |
| WO | 9526323 A1 | 10/1995 |
| WO | WO 95/26323 * | 10/1995 |

OTHER PUBLICATIONS

Abstract for CN 101891439, Nov. 2010.*
Translation for PCT/FR1995/000385 Publication No. WO 95/26323.
International Search Report and Written Opinion dated Apr. 14, 2014 (PCTUS2013/075530).

* cited by examiner

BUILDING MATERIALS, COMPOSITIONS, AND METHODS

CROSS-REFERENCE TO RELATED APPLICATIONS

This application is a continuation-in-part of U.S. application Ser. No. 13/722,626, filed Dec. 20, 2012, now U.S. Pat. No. 8,926,855, which is incorporated herein by reference in its entirety.

BACKGROUND

The present invention relates generally to the field of sound dampening materials, and more particularly to plaster-based materials having improved sound dampening properties.

Plaster-based materials are used in a variety of building and construction applications where sound dampening properties are desirable. For example, gypsum panels are used in wall, door, floor, ceiling, roof, and other building applications. In multi-family and commercial buildings, floor/ceiling assemblies commonly include plaster-based materials as part of the subfloor structure. For example, gypsum underlayments are typically applied over structural concrete or precast concrete planks in floor/ceiling assemblies to create a smooth, monolithic floor surface that delivers superior strength, sound control, and fire resistance as compared to Portland cement and other products.

To mitigate impact or airborne related noise from transferring through such structures, acoustical sound mats are commonly laid over concrete or wood subfloors. The mats are a fabric material which creates an air space between the subfloor and gypsum underlayment. The air space serves to mechanically isolate and decouple impact related vibrations. The sound mat is typically topped with a pumpable, sanded gypsum underlayment ¾ to 1 inch thick and screeded to maintain a uniform depth and finish.

However, there are drawbacks to the current system. For example, acoustical sound mats are very expensive per square foot and are time consuming and costly to install. Sound mats are also prone to shift under heavy loads and/or from hard impacts, which can cause flooring or tiles to crack. For this reason, another costly reinforcement-type mat or an even more expensive metal lathing is commonly installed overtop the sound mats before the gypsum underlayment is poured. Additionally, the acoustical mats create a mechanical air space but do little to abate sound vibrations at low to mid frequencies and must rely predominately on the mass of the assembly for abatement of these vibrations.

Accordingly, there is a need for materials having improved sound dampening properties.

SUMMARY

In one aspect, sound dampening materials are provided, including a dampening layer which comprises a plaster and hollow microspheres.

In another aspect, methods of making a sound dampening material are provided, including combining water, hollow microspheres, and a plaster to form a slurry, and applying the slurry to a surface so that the slurry sets to form a dampening layer.

In yet another aspect, methods of dampening sound through a structure are provided, including disposing a dampening layer on a surface of or within the structure, the dampening layer comprising a plaster, and hollow microspheres.

BRIEF DESCRIPTION OF THE DRAWINGS

Referring now to the drawings, which are meant to be exemplary and not limiting, and wherein like elements are numbered alike.

DETAILED DESCRIPTION

Disclosed herein are materials having improved sound dampening properties, and compositions and methods for their manufacture and use. These materials may be used, for example, in building and construction applications where impact and/or airborne noise abatement is desirable, such as in doors, roofs, walls, floors, and ceilings. In certain embodiments, the sound dampening materials described herein may be used in gypsum underlayment systems, for example in floor/ceiling assemblies in multifamily or commercial buildings.

Such materials may have sound attenuation properties that meet regional or national building codes. For example, floor/ceiling assemblies may have a minimum Impact Insulation Class (IIC) rating of 50, as measured according to ASTM E989, and/or a minimum Impact Insulation Class Field rating of 45, as measured according to ASTM 1007.

In certain embodiments, a sound dampening material has a dampening layer including a plaster, and hollow microspheres. For example, the plaster may include alpha hemihydrate gypsum, beta hemihydrate gypsum, fine grind molding plaster, fly ash type C, Portland cement (such as Type I Portland cement or Type II Portland cement), dispersant, retarder, defoamer, boric acid, landplaster, or any combination thereof. In one embodiment, the plaster is a sanded gypsum. For example, the sand may include washed sands, masonry sands, plaster sands, and any combination thereof. For example, the dampening layer may include the plaster in an amount from about 30 wt. % to about 99.5 wt. %, measured on a dry basis, such as from about 30 wt. % to about 80 wt. %, or from about 50 wt. % to about 80 wt. %. In certain embodiments, the dampening layer includes the plaster in an amount from about 50 wt. % to about 95.5 wt. %, measured on a dry basis.

The hollow microspheres may have a polymeric shell that encapsulates a gas. For example, the polymeric shell may include vinylidene chloride, acrylonitrile, methyl methacrylate, copolymers thereof, or any combination thereof. The encapsulated gas may be a hydrocarbon blowing agent, such as isobutene or isopentane. The hollow microspheres may have an average diameter of about 20 μm to about 150 μm. The hollow microspheres may be expanded microspheres that are provided dry or pre-wet. The amount of microspheres included in the dampening layer is measured herein as a weight percent of the dry or pre-wet microspheres that are contained in the dampening layer on a dry basis.

For example, the dampening layer may include the expanded dry or pre-wet hollow microspheres in an amount from about 0.5 wt. % to about 10 wt. %, measured on a dry basis. In one embodiment, the dampening layer includes the hollow microspheres in an amount from about 5 wt. % to about 10 wt. %, measured on a dry basis.

In certain embodiments, the dampening layer also includes a viscoelastic polymer. The viscoelastic polymer may be selected from the group consisting of polyvinyl butyral, acrylics, polyurethanes, vinyl ethers, ethylene vinyl acetates, styrene block copolymers, polyolefin copolymers, butyl rubber, natural rubber, silicones, and nitriles. In one embodiment, the viscoelastic polymer is polyvinyl butyral (PVB). In one embodiment, the viscoelastic polymer is PVB having an average particle size from about 100 µm to about 400 µm. In certain embodiments, PVB is in a particulate form, for example having an average particle size of about 100 nm to about 1000 µm. For example, the dampening layer may include the viscoelastic polymer in an amount from about 0.5 wt. % to about 20 wt. %, measured on a dry basis. In certain embodiments, the dampening layer includes the viscoelastic polymer in an amount from about 1 wt. % to about 12 wt. %, or from about 5 wt. % to about 12 wt. %, measured on a dry basis.

Without being bound by a particular theory, it is believed that the hollow microspheres and/or the viscoelastic polymer within the dampening layer undergo plastic deformation under impact and under static loads when the layer is stressed, for example from people walking or dropping things on the floor. It is also believed that the viscoelastic polymer and/or hollow microspheres within the dampening layer advantageously absorb vibrational energy as well as dissipate vibrational energy as frictional heat, thereby reducing the amount of energy transferred though the material and the amount of noise transferred to adjacent structures. Thus, the materials described herein may provide impact and airborne noise abatement, as opposed to traditional fabric sound mats, which generally provide minimal impact noise abatement.

As compared to dampening layers containing only a viscoelastic polymer, it is believed that the thin-walled nature of the microspheres permits additional deformation in layers therewith. The microspheres used herein have a Poisson's ratio near zero, meaning they show very little lateral expansion when compressed, thereby making compression easier. As shown in the Examples below, the combination of microspheres with plaster, optionally with a viscoelastic polymer, is particularly effective at damping at coincident and higher frequencies than other dampening layer compositions. It is believed that this is because the use of hollow microspheres in the dampening layer, optionally with the viscoelastic polymer, improves the acoustical impedance of the assembly. For example, as extension of the surrounding layers occurs in an assembly under vibrational loading, the dampening layer is able to be deformed and dissipate energy as heat.

In certain embodiments, the dampening layer also includes a barium salt. For example, the barium salt may be selected from the group consisting of barium sulfate, barium oxide, barium chloride, barium fluoride, barium sulfide, barium carbonate, barium peroxide, barium hydride, and combinations thereof. In one embodiment, the dampening layer includes a plaster, a viscoelastic polymer, hollow microspheres, and barium sulfate. In another embodiment, the dampening layer includes a plaster, hollow microspheres, and barium sulfate. For example, the dampening layer may include a barium salt in an amount from about 1 wt. % to about 40 wt. %., or in an amount from about 10 wt. % to about 25 wt. %, measured on a dry basis. In certain embodiments, the barium sulfate has an average particle size of 325 µm.

In certain embodiments, the dampening layer also includes a high atomic weight material, a high molecular density material, or a combination thereof. For example, the high atomic weight material or the high molecular density material may be selected from the group consisting of barium sulfate, calcium silicate, zinc oxide, lead, zirconium dioxide, carbonyl iron powders, aluminum powder, iron powder, stainless steel powder, copper powder, bismuth powder, tungsten powder, bismuth oxide powder, niobium powder, tantalum powder, molybdenum powder, Borated high-density polyethylene (HDPE), fly ash class C, and any combination thereof.

Without being bound by a particular theory, it is believed that the barium salt and/or high atomic weight/molecular density material adds mass to the layer, which is effective to initially resist vibration, but also acts synergistically with the viscoelastic polymer and hollow microspheres to increase the dampening capacity at different frequencies. However, the present formulation may incorporate lower amounts of these materials than previously believed necessary because of the synergistic effects of the combination of plaster and hollow microspheres, optionally with a viscoelastic polymer.

In certain embodiments, additional additives may be included in the dampening layer. For example, polypropylene fibers and diatum gum may be included to improve the stability of the dampening formulations. For example, dampening formulations may include up to 1 wt. % of additives, measured on a dry basis. In one embodiment, a dampening layer includes up to 0.5 wt. % polypropylene fibers, or about 0.05% polypropylene fibers, measured on a dry basis. In one embodiment, a dampening layer includes up to 0.05 wt. % diatum gum, or about 0.02 wt. % diatum gum, about 0.0125 wt. % diatum gum, or about 0.2 wt. % diatum gum, measured on a dry basis.

For example, the dampening layers described herein may be used as sound dampening materials in floor/ceiling underlayments. In certain embodiments, a method of dampening sound through a structure includes disposing a dampening layer as described herein on a surface of or within the structure. For example, the dampening layer may include a plaster, a viscoelastic polymer, and hollow microspheres. The structure may be a wall, door, floor, ceiling, roof, floor/ceiling assembly, or other building material for which sound dampening properties are desirable.

Figure 1:
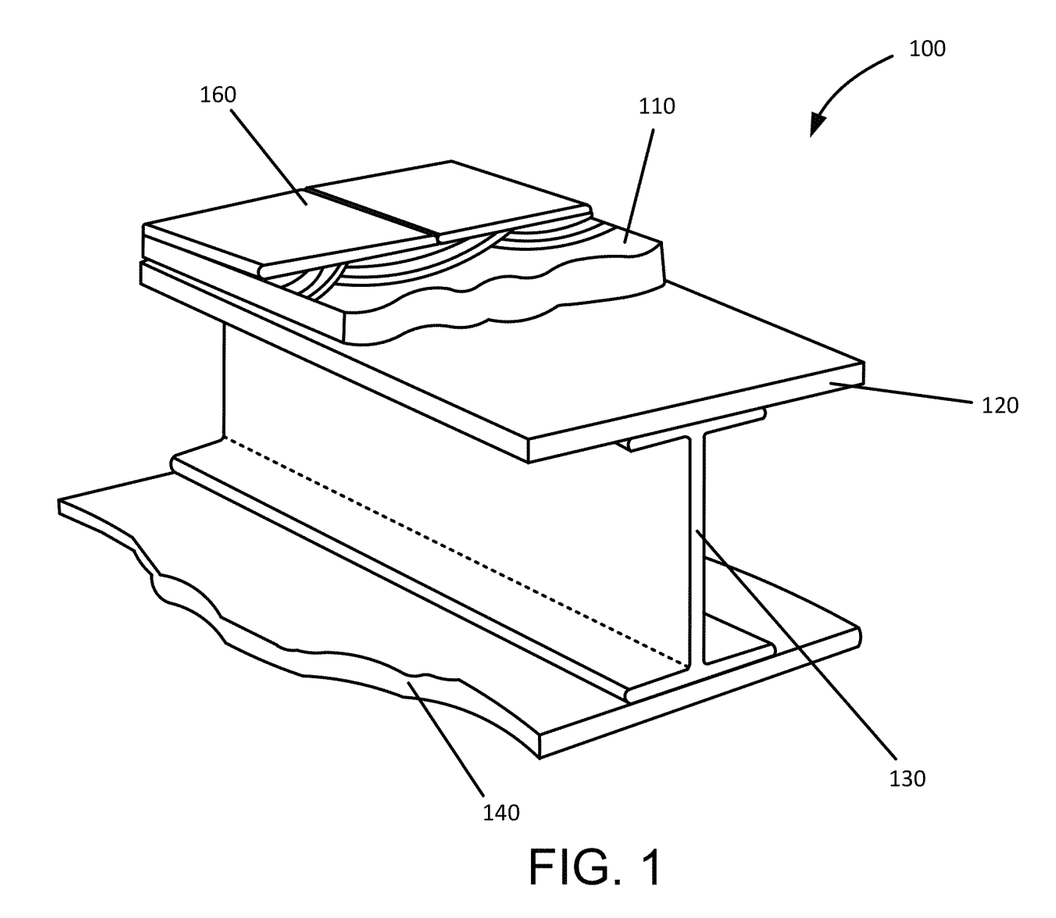
FIG. 1 is a perspective view of one embodiment of a subfloor assembly including a sound dampening layer.
Figure 3:
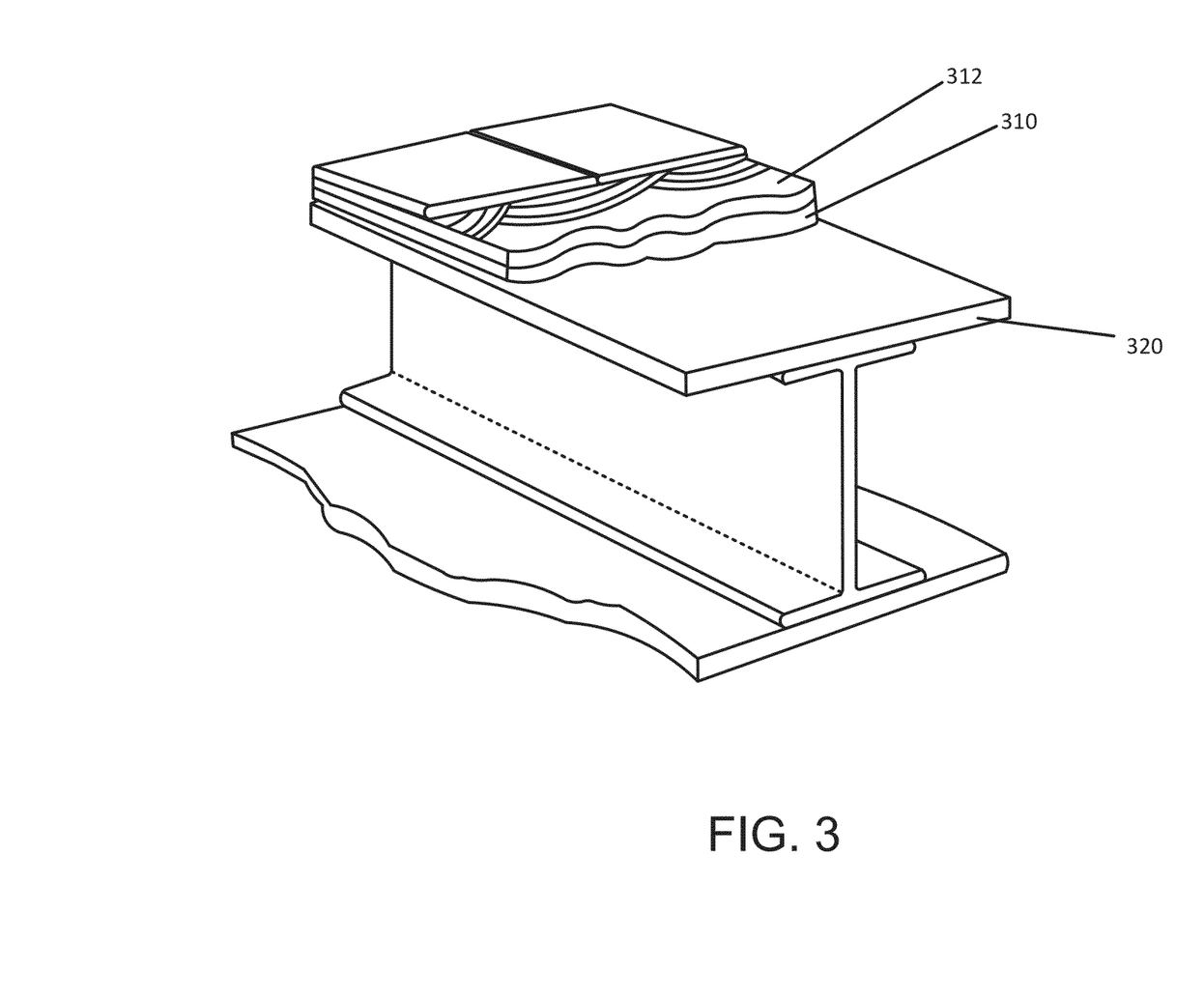
FIG. 3 is a perspective view of one embodiment of a subfloor assembly including a sound dampening layer.

The dampening layers described herein are advantageously pumpable in nature and therefore may be easily applied to a subfloor (e.g., a concrete or wood subfloor) in the field. For example, as shown in FIG. 1, a subfloor assembly 100 includes a subfloor 120 that is supported by a support beam 130 that is adjacent a plaster board 140 (e.g., a gypsum board). Dampening layer 110 may be applied on the subfloor 120 and screeded to achieve a uniform thickness and finish. The dampening layer may be utilized in place of a standard underlayment or may be used in conjunction with a standard underlayment. For example, as shown in FIG. 3, dampening layer 310 is applied to subfloor 320 and underlayment layer 312 is applied to the surface of the dampening layer 310 opposite the subfloor 320.

In certain embodiments, the dampening layer has a thickness of at least 0.03 inch. For example, the dampening layer may have a thickness of about 0.25 inch to about 1.0 inch, of about 0.25 inch to about 0.75 inch, or of about 0.25 inch to about 0.625 inch. In one embodiment, the dampening layer is only as thick as is necessary to achieve a continuous layer. Any additional underlayment layer (e.g., a sanded gypsum underlayment) may have a thickness of at least 0.03 inch. For example, the underlayment layer may have a thickness of about 0.5 inch to about 1.0 inch.

The sound dampening layer may have an internal friction of at least 0.004. For example, the sound dampening layer may have an internal friction of about 0.005 to about 0.20. The sound dampening layer may also have an elastic modulus below 2.0 GPa. For example, the sound dampening layer may have an elastic modulus of about 0.5 GPa to about 2.0 GPa. The sound dampening material may have an Impact Insulation Class (IIC) rating of 45 or greater. In one embodiment, the sound dampening material has an IIC rating from 35 to 55.

Compositions for making sound dampening layers may include a plaster and hollow microspheres, optionally with a viscoelastic polymer, a barium salt, a high atomic weight, or a high molecular density material, as described above.

Methods for making the sound dampening materials described herein generally may include combining water, hollow microspheres, and a plaster to form a slurry, and applying the slurry to a surface so that the slurry sets to form a dampening layer. The slurry may also include a viscoelastic polymer, barium salt, and/or other suitable additives. The plaster, viscoelastic polymer, barium salt, and hollow microspheres may be provided in any form or amount as described herein.

For example, the water may be combined in an amount of a water to stucco formulation ratio from about 0.4 to about 0.9, such as from about 0.44 to about 0.77. For example, water may be added in an amount effective to bring the plaster mixture to a pumpable consistency. In one embodiment, the slurry includes plaster in an amount from about 30 weight percent to about 95.5 weight percent, viscoelastic polymer in an amount from about 1 weight percent to about 12 weight percent, and hollow microspheres in an amount from about 0.5 weight percent to about 10 weight percent, wherein the weight percentages are measured on a dry basis. In one embodiment, the slurry includes plaster in an amount from about 50 weight percent to about 95.5 weight percent, viscoelastic polymer in an amount from about 5 weight percent to about 12 weight percent, and hollow microspheres in an amount from about 0.5 weight percent to about 10 weight percent, wherein the weight percentages are measured on a dry basis.

In one embodiment, the viscoelastic polymer is provided in the form of a dispersion and mixed with water, plaster, and hollow microspheres to form a slurry. For example, the dispersion may contain PVB in an amount from about 1 wt. % to about 75 wt. %.

The slurry may be applied to a surface, for example a subfloor. For example, the slurry may be pumped onto the surface. The slurry may be allowed to set and form a dampening layer.

As shown in FIG. 1, the sound dampening layer 110 may act as the sole underlayment of a subfloor assembly 100. The sound dampening layer 110 may be pumped onto the subfloor 120 and allowed to set. In such embodiments, the dampening layer may have a thickness of about 0.25 inch to about 1 inch. Flooring, such as ceramic tile 160, may be applied to the set surface of the dampening layer 110.

Figure 2:
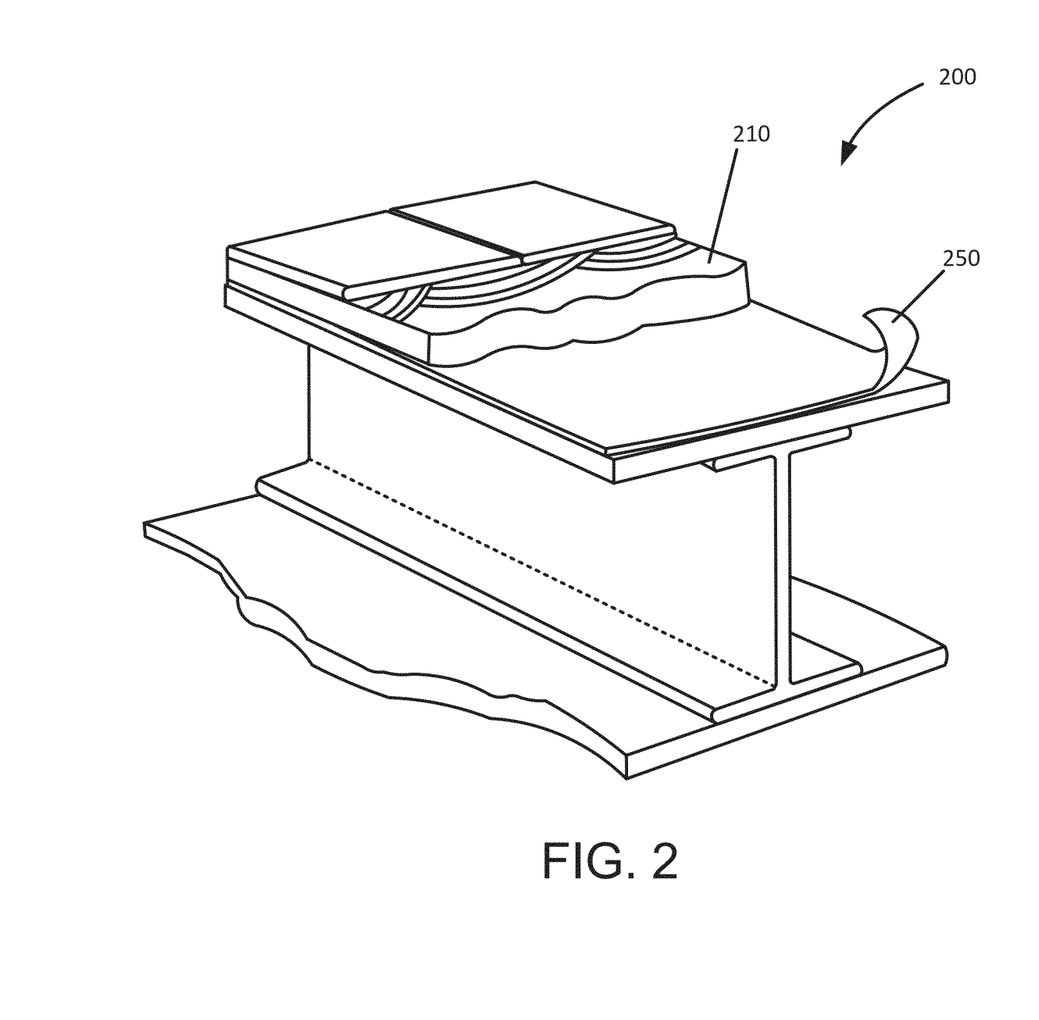
FIG. 2 is a perspective view of one embodiment of a subfloor assembly including a sound dampening layer.

As shown in FIG. 2, the sound dampening layer 210 may be applied to the surface of a sound isolation mat 250 to increase the sound dampening attributes of subfloor assembly 200. For example, the sound isolation mat may include commercially available board or roll-type sound underlayment mats, such as woven, non-woven, felt, rubber, cork, polymeric, or other mats.

As shown in FIG. 3, the dampening layer 310 may applied to subfloor 320 and an underlayment layer 312 may be applied to the surface of the dampening layer 310 opposite the subfloor 320. In such embodiments, the dampening layer may have a thickness of about 0.25 inch to about 0.75 inch. The additional underlayment layer (e.g., a pumpable sanded gypsum underlayment) may have a thickness of at least 0.03 inch. For example, the underlayment layer may have a thickness of about 0.25 inch to about 1.0 inch. After application to the dampening layer, a plaster underlayment slurry may be allowed to set to form a plaster underlayment.

The sound dampening material may cause the subfloor assembly to have an Impact Insulation Class (IIC) rating of 45 or greater. In one embodiment, the subfloor assembly has an IIC rating from 35 to 55.

Figure 4:
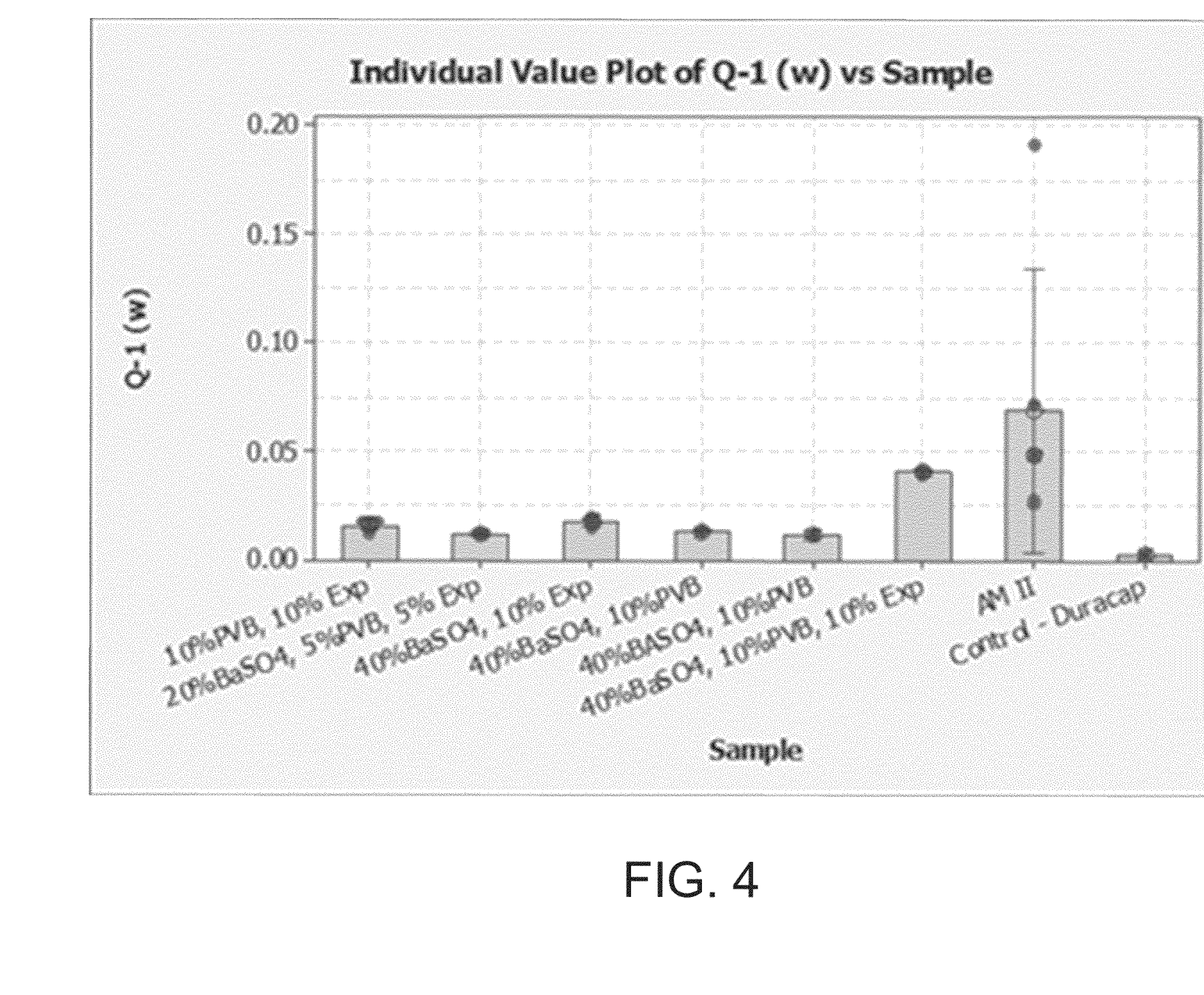
FIG. 4 is a chart illustrating the internal friction damping of certain embodiments of sound dampening materials.
Figure 5:
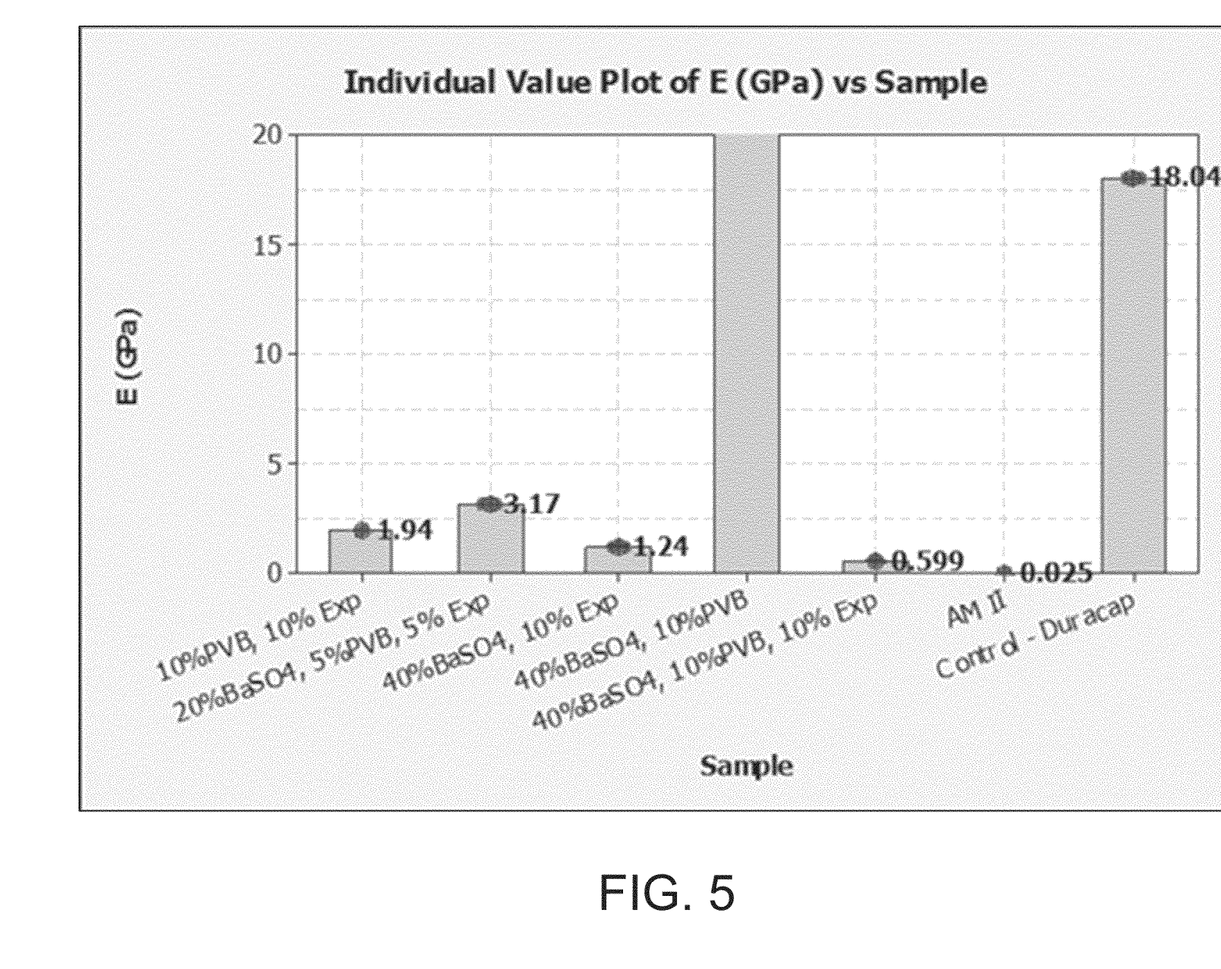
FIG. 5 is a chart illustrating the elastic modulus of certain embodiments of sound dampening materials.
Figure 6:
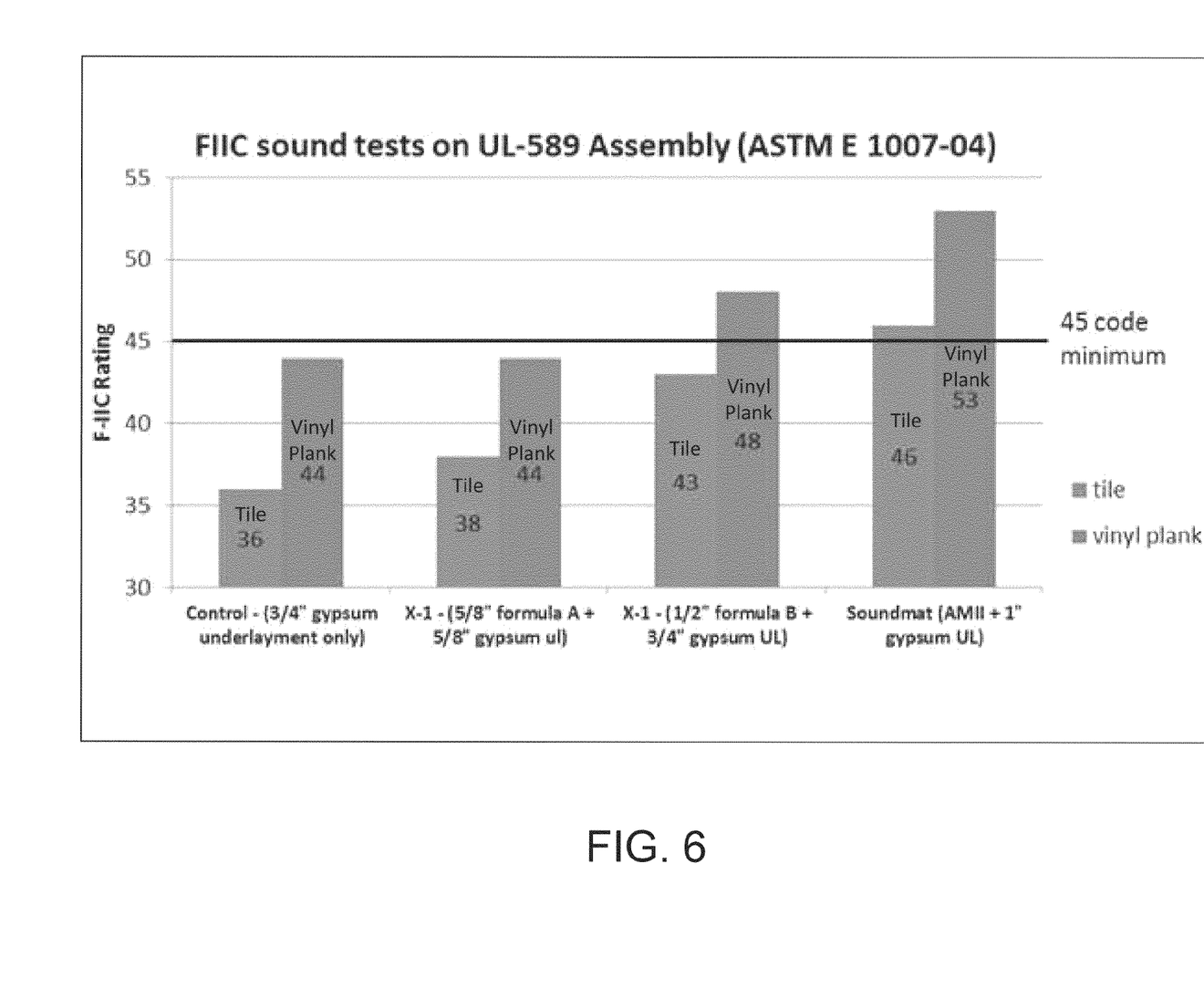
FIG. 6 is a chart illustrating the F-IIC rating of certain embodiments of sound dampening underlayment assemblies.

Embodiments of the dampening materials disclosed herein were manufactured and tested for sound dampening properties. The results are shown in FIGS. 4, 5, and 6.

EXAMPLE 1

Sound dampening material 2" by 4" test samples were prepared using varying amounts of barium sulfate in the form of a 325 micron powder (commercially available from Cimbar, located in Georgia, USA), PVB in the form of a 400 micron powder (commercially available from Shark Solutions LTD, located in Denmark), and hollow polymeric microspheres having a shell of copolymers of polyvinylidene chloride (PVDC) and polyacrylonitrile (PAN) (commercially available as EXPANCEL from Akzo Nobel Pulp and Performance). EXPANCEL is referred to by the abbreviation "Exp" in FIGS. 4 and 5. The microspheres used were wet, expanded microspheres having a solid content of about 15% and an average particle size of 40 micron.

DURA-CAP 254 plaster (Georgia Pacific Gypsum) was used as the plaster base for the dampening layer samples. ACOUSTIMAT II (AM II) products (commercially available from Maxxon Corporation, located in Hamel, Minn.) were used for comparative samples. AM II includes a non-woven fabric mat and a standard gypsum underlayment, such as DURA-CAP. The ACOUSTIMAT products represent the current sound dampening characteristics of dampening materials incorporating sound mats.

Tests were conducting using a Buzzsonic 5.9 instrument designed to test solid materials by the Impulse Excitation Technique (IET). Specifically, the device measures and analyzes vibrational decay of impulse excited solids.

The samples were tested as a single or layered construction and placed across a span of thin nylon threads, which reduce external damping. The samples were then tapped lightly with a small mallet, thereby generating a standing wave in the solid. The resulting sound was captured with a microphone directly underneath the sample and attached to a computer that analyzes the sound using a Fast Fourier Transform algorithm. The waveform and power/frequency spectrum of the sound were determined, from which the damping properties and resonant frequencies were calculated. The peak amplitude of vibrations of an impulse-excited solid follows an exponential decay. The damping ratio, which determines the internal friction of the material $Q^{-1}$ (obtained from the damping ratio), and the dynamic Young's modulus (i.e., the elastic modulus) were used in evaluating materials. The internal friction and elastic modulus calculated from the waveform exponential decay curve was used as the primary means of differentiating between samples. It is believed that high internal friction and low elastic modulus provide improved damping at high frequencies (critical/coincidence region).

FIG. 4 shows the damping ability ($Q^{-1}$) of the tested samples, with the formulations shown in dry weight percentages, with the remainder including plaster. A higher $Q^{-1}$ indicates a higher damping ability. The best damping results were obtained with higher amounts of PVB and microspheres. However, it was observed that above approximately 10 wt. % microspheres, the formulation becomes friable.

FIG. 5 shows the elastic modulus of the tested samples, with the formulations shown in dry weight percentages, with the remainder including plaster. As explained above, a low elastic modulus provides improved damping at high frequencies. The results show that the formulations containing the microspheres have a significantly lower elastic modulus than similar formulations without microspheres.

It was observed that the formulations could include lower amounts of barium sulfate than previous formulas. In fact, barium sulfate may be optional in this formulation as its usefulness is in providing mass is believed to be in the low frequency range and not in influencing the IIC rating of the assemblies, based on test results. The test results also indicate that there is an ample amount of mass (e.g., in the assembly/gypsum top layer) based on the lower impact sound level curve in this region. The PVB and polymeric microspheres combination shows better performance in coincidence controlled regions.

EXAMPLE 2

A control underlayment formulation (labeled "formula A" in test results) was prepared with 50% plaster, 10% PVB in the form of a 400 micron powder (commercially available from Shark Solutions LTD, located in Denmark), and 40% barium sulfate in the form of a 325 micron powder (commercially available from Cimbar, located in Georgia, USA), by dry weight. Prior experiments with this control formulation yielded consistently higher IICF ratings than gypsum only underlayments. At lower frequencies (i.e., lower than 1000 Hz), the control formulation also performed better than acoustical mat products. At higher frequencies (i.e., higher than 1000 Hz), known as coincidence controlled regions, the control formulation did not perform as well as known acoustical mat products.

An experimental formulation (labeled "formula B" in test results) was prepared with 77.19% plaster, 9.00% PVB, 10.00% barium sulfate, 1.13% of dry, expanded hollow polymeric microspheres having a shell of copolymers of PVDC and PAN (commercially available as EXPANCEL from Akzo Nobel Pulp and Performance), 0.05% polypropylene fibers, 2.50% plasticizer powder (commercially available as LOMAR D from GEO Specialty Chemicals), 0.12% BMA, and 0.02% Diutan Gum (commercially available as KELCO-CRETE from CP Kelco).

Sound tests on a L-589 I-Beam assembly were performed to measure the F-IIC ratings of the samples, Results are shown in FIG. 6 for both tile and vinyl plank flooring assemblies for the various underlayment formulations. As is shown, the underlayment containing the hollow microspheres show a 4 IIC improvement over a similar formulation without microspheres, and show only a 3-5 IIC below the current commercial mat products, Overall, it was found that formulations combining a viscoelastic polymer and hollow microspheres produced pumpable vibration dampening underlayments with unique sound abatement properties, especially at mid to high frequencies.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A sound dampening material, comprising:
a dampening layer which comprises a plaster, hollow microspheres, and a barium salt selected from the group consisting of barium sulfate, barium oxide, barium chloride, barium fluoride, barium sulfide, barium carbonate, barium peroxide, barium hydride, and any combination thereof.

2. The sound dampening material of claim 1, wherein the hollow microspheres comprise a polymeric shell encapsulating a gas.

3. The sound dampening material of claim 2, wherein the polymeric shell comprises vinylidene chloride, acrylonitrile, methyl methacrylate, copolymers thereof, or any combination thereof.

4. The sound dampening material of claim 2, wherein the gas comprises a hydrocarbon blowing agent.

5. The sound dampening material of claim 1, wherein the hollow microspheres have an average diameter of about 20 μm to about 150 μm.

6. The sound dampening material of claim 1, wherein the dampening layer further comprises a viscoelastic polymer.

7. The sound dampening material of claim 6, wherein the viscoelastic polymer comprises polyvinyl butyral.

8. The sound dampening material of claim 6, wherein the viscoelastic polymer is selected from the group consisting of polyvinyl butyral, acrylics, polyurethanes, vinyl ethers, ethylene vinyl acetates, styrene block copolymers, polyolefin copolymers, butyl rubber, natural rubber, silicones, nitriles, and any combination thereof.

9. The sound dampening material of claim 1, wherein the plaster comprises alpha hemihydrate gypsum, beta hemihydrate gypsum, fine grind molding plaster, fly ash type C, Portland cement, dispersant, retarder, defoamer, boric acid, landplaster, or any combination thereof.

10. The sound dampening material of claim 1, wherein the dampening layer further comprises a high atomic weight material or high molecular density material selected from the group consisting of barium sulfate, calcium silicate, zinc oxide, lead, zirconium dioxide, carbonyl iron powders, aluminum powder, iron powder, stainless steel powder, copper powder, bismuth powder, tungsten powder, bismuth oxide powder, niobium powder, tantalum powder, molybdenum powder, Borated high-density polyethylene, fly ash class C, and any combination thereof.

11. The sound dampening material of claim 1, wherein the dampening layer comprises plaster in an amount from about 30 weight percent to about 95.5 weight percent, and hollow microspheres in an amount from about 0.5 weight percent to about 10 weight percent, wherein the weight percentages are measured on a dry basis.

12. The sound dampening material of claim 6, wherein the dampening layer comprises plaster in an amount from about 30 weight percent to about 95.5 weight percent, viscoelastic polymer in an amount from about 1 weight percent to about 12 weight percent, and hollow microspheres in an amount from about 0.5 weight percent to about 10 weight percent, wherein the weight percentages are measured on a dry basis.

13. The sound dampening material of claim 1, wherein the dampening layer comprises plaster in an amount from about 50 weight percent to about 95.5 weight percent, and hollow microspheres in an amount from about 5 weight percent to about 10 weight percent, wherein the weight percentages are measured on a dry basis.

14. The sound dampening material of claim 6, wherein the dampening layer comprises plaster in an amount from about 50 weight percent to about 95.5 weight percent, viscoelastic polymer in an amount from about 5 weight percent to about 12 weight percent, and hollow microspheres in an amount from about 5 weight percent to about 10 weight percent, wherein the weight percentages are measured on a dry basis.

15. A method of making a sound dampening material, comprising:
    combining water, hollow microspheres, a plaster, and a barium salt to form a slurry; and
    applying the slurry to a surface so that the slurry sets to form a dampening layer,
    wherein the barium salt is selected from the group consisting of barium sulfate, barium oxide, barium chloride, barium fluoride, barium sulfide, barium carbonate, barium peroxide, barium hydride, and any combination thereof.

16. The method of claim 15, wherein the hollow microspheres comprise a polymeric shell encapsulating a gas, the polymeric shell comprising vinylidene chloride, acrylonitrile, methyl methacrylate, copolymers thereof, or any combination thereof.

17. The method of claim 15, wherein the step of combining further comprises combining a viscoelastic polymer with the water, hollow microspheres, plaster, and barium salt to form the slurry.

18. The method of claim 17, wherein the viscoelastic polymer is selected from the group consisting of polyvinyl butyral, acrylics, polyurethanes, vinyl ethers, ethylene vinyl acetates, styrene block copolymers, polyolefin copolymers, butyl rubber, natural rubber, silicones, nitriles, and any combination thereof.

19. The method of claim 15, wherein the plaster comprises alpha hemihydrate gypsum, beta hemihydrate gypsum, fine grind molding plaster, fly ash type C, Portland cement, dispersant, retarder, defoamer, boric acid, landplaster, or any combination thereof.

20. The method of claim 15, wherein the slurry comprises plaster in an amount from about 30 weight percent to about 95.5 weight percent, and hollow microspheres in an amount from about 0.5 weight percent to about 10 weight percent, wherein the weight percentages are measured on a dry basis.

21. The method of claim 17, wherein the slurry comprises plaster in an amount from about 30 weight percent to about 95.5 weight percent, viscoelastic polymer in an amount from about 1 weight percent to about 12 weight percent, and hollow microspheres in an amount from about 0.5 weight percent to about 10 weight percent, wherein the weight percentages are measured on a dry basis.

22. The method of claim 15, wherein the slurry comprises plaster in an amount from about 50 weight percent to about 95.5 weight percent, and hollow microspheres in an amount from about 5 weight percent to about 10 weight percent, wherein the weight percentages are measured on a dry basis.

23. The method of claim 17, wherein the slurry comprises plaster in an amount from about 50 weight percent to about 95.5 weight percent, viscoelastic polymer in an amount from about 5 weight percent to about 12 weight percent, and hollow microspheres in an amount from about 5 weight percent to about 10 weight percent, wherein the weight percentages are measured on a dry basis.

24. A sound dampening material, comprising:
    a dampening layer which comprises a plaster, hollow microspheres, and a high atomic weight material or high molecular density material selected from the group consisting of barium sulfate, calcium silicate, zinc oxide, lead, zirconium dioxide, carbonyl iron powders, aluminum powder, iron powder, stainless steel powder, copper powder, bismuth powder, tungsten powder, bismuth oxide powder, niobium powder, tantalum powder, molybdenum powder, Borated high-density polyethylene, fly ash class C, and any combination thereof.

25. The sound dampening material of claim 24, wherein the hollow microspheres comprise a polymeric shell encapsulating a gas.

26. The sound dampening material of claim 25, wherein the polymeric shell comprises vinylidene chloride, acrylonitrile, methyl methacrylate, copolymers thereof, or any combination thereof.

27. The sound dampening material of claim 25, wherein the gas comprises a hydrocarbon blowing agent.

28. The sound dampening material of claim 24, wherein the hollow microspheres have an average diameter of about 20 μm to about 150 μm.

29. The sound dampening material of claim 24, wherein the dampening layer further comprises a viscoelastic polymer.

30. The sound dampening material of claim 29, wherein the viscoelastic polymer is selected from the group consisting of polyvinyl butyral, acrylics, polyurethanes, vinyl ethers, ethylene vinyl acetates, styrene block copolymers, polyolefin copolymers, butyl rubber, natural rubber, silicones, nitriles, and any combination thereof.

31. The sound dampening material of claim 24, wherein the plaster comprises alpha hemihydrate gypsum, beta hemihydrate gypsum, fine grind molding plaster, fly ash type C, Portland cement, dispersant, retarder, defoamer, boric acid, landplaster, or any combination thereof.

32. The sound dampening material of claim 24, wherein the dampening layer comprises plaster in an amount from about 30 weight percent to about 95.5 weight percent, and hollow microspheres in an amount from about 0.5 weight percent to about 10 weight percent, wherein the weight percentages are measured on a dry basis.

33. The sound dampening material of claim 24, wherein the dampening layer comprises plaster in an amount from about 50 weight percent to about 95.5 weight percent, and hollow microspheres in an amount from about 5 weight percent to about 10 weight percent, wherein the weight percentages are measured on a dry basis.

34. A method of making a sound dampening material, comprising:
    combining water, hollow microspheres, a plaster, and a high atomic weight material or high molecular density material, to form a slurry; and
    applying the slurry to a surface so that the slurry sets to form a dampening layer,
    wherein the high atomic weight material or high molecular density material is selected from the group consisting of barium sulfate, calcium silicate, zinc oxide, lead, zirconium dioxide, carbonyl iron powders, aluminum powder, iron powder, stainless steel powder, copper powder, bismuth powder, tungsten powder, bismuth oxide powder, niobium powder, tantalum powder, molybdenum powder, Borated high-density polyethylene, fly ash class C, and any combination thereof.

35. The method of claim 34, wherein the hollow microspheres comprise a polymeric shell encapsulating a gas, the polymeric shell comprising vinylidene chloride, acrylonitrile, methyl methacrylate, copolymers thereof, or any combination thereof.

36. The method of claim 34, wherein the step of combining further comprises combining a viscoelastic polymer with the water, hollow microspheres, plaster, and high atomic weight material or high molecular density material, to form the slurry.

37. The method of claim 36, wherein the viscoelastic polymer is selected from the group consisting of polyvinyl butyral, acrylics, polyurethanes, vinyl ethers, ethylene vinyl acetates, styrene block copolymers, polyolefin copolymers, butyl rubber, natural rubber, silicones, nitriles, and any combination thereof.

38. The method of claim 34, wherein the plaster comprises alpha hemihydrate gypsum, beta hemihydrate gypsum, fine grind molding plaster, fly ash type C, Portland cement, dispersant, retarder, defoamer, boric acid, landplaster, or any combination thereof.

39. The method of claim 34, wherein the slurry comprises plaster in an amount from about 30 weight percent to about 95.5 weight percent, and hollow microspheres in an amount from about 0.5 weight percent to about 10 weight percent, wherein the weight percentages are measured on a dry basis.

40. The method of claim 34, wherein the slurry comprises plaster in an amount from about 50 weight percent to about 95.5 weight percent, and hollow microspheres in an amount from about 5 weight percent to about 10 weight percent, wherein the weight percentages are measured on a dry basis.

* * * * *